United States Patent [19]

Oota

[11] Patent Number: 4,982,709
[45] Date of Patent: Jan. 8, 1991

[54] APPARATUS FOR CONTROLLING THE IDLING SPEED OF ENGINE OPERABLE ON GASOLINE/ALCOHOL FUEL BLEND

[75] Inventor: Tadaki Oota, Fujisawa, Japan
[73] Assignee: Nissan Motor Company, Ltd., Japan
[21] Appl. No.: 495,970
[22] Filed: Mar. 20, 1990
[30] Foreign Application Priority Data Mar. 28, 1989 [JP] Japan .................................. 1-75860

[51] Int. Cl.⁵ ............................................. F02D 41/16
[52] U.S. Cl. .................................... 123/339; 123/1 A; 123/362
[58] Field of Search ........................ 123/339, 1 A, 362

[56] References Cited

U.S. PATENT DOCUMENTS 4,706,629 11/1987 Wineland et al. .................. 123/1 A
4,706,630 11/1987 Wineland et al. .................. 123/1 A

FOREIGN PATENT DOCUMENTS 57-38640 3/1982 Japan .................................. 123/1 A
57-76231 5/1982 Japan .................................. 123/1 A
61-218746 9/1986 Japan .................................. 123/1 A
63-41015 3/1988 Japan .

*Primary Examiner*—Andrew M. Dolinar
*Attorney, Agent, or Firm*—Lowe, Price, LeBlanc, Becker & Shur

[57] ABSTRACT

An apparatus for use with an internal combustion engine operable on either of gasoline fuel, alcohol fuel and gasoline/alcohol fuel blend. The apparatus comprises an alcohol concentration sensor for producing a signal indicative of an alcohol concentration of the fuel to be delivered to the engine, an oxygen sensor for producing a signal indicative of an oxygen content of exhaust gases discharged from the engine, and an engine coolant temperature sensor for producing a signal indicative of an engine coolant temperature. A control unit is coupled to the alcohol-concentration, oxygen and engine-coolant-temperature sensors. The control unit is responsive to the air/fuel ratio feedback signal for correcting the fuel supplied to the engine to maintain a desired air/fuel ratio when the sensed engine coolant temperature exceeds a predetermined value. The control unit is also responsive to an idle engine condition for calculating a target value for engine idling speed as a function of alcohol concentration and engine coolant temperature when the coolant temperature is below the predetermined value. An engine speed control device is coupled to the control unit for adjusting the engine speed at the calculated target value.

5 Claims, 3 Drawing Sheets

FIG. 3A

M85 TABLE

| -40°C | -30°C | -20°C | -10°C | 0°C |
|---|---|---|---|---|
| 2500rpm | 2200rpm | 2200rpm | 2200rpm | 2200rpm |
| 10°C | 20°C | 30°C | 40°C | 50°C |
| 2200rpm | 2200rpm | 2000rpm | 1600rpm | 1400rpm |

FIG. 3B

M0 TABLE

| -40°C | -30°C | -20°C | -10°C | 0°C |
|---|---|---|---|---|
| 2500rpm | 2200rpm | 2200rpm | 2200rpm | 2000rpm |
| 10°C | 20°C | 30°C | 40°C | 50°C |
| 1600rpm | 1200rpm | 1000rpm | 900rpm | 800rpm |

APPARATUS FOR CONTROLLING THE IDLING SPEED OF ENGINE OPERABLE ON GASOLINE/ALCOHOL FUEL BLEND

BACKGROUND OF THE INVENTION

This invention relates to an apparatus for controlling an internal combustion engine operable on either of gasoline fuel, alcohol fuel and gasoline/alcohol fuel blend and, more particularly, to an apparatus for controlling the idling speed of such an engine.

For example, Japanese Utility Model Application No. 63-41015, filed by the same applicant of the invention, discloses an apparatus for controlling the idling speed of an internal combustion engine operable on gasoline fuel or gasoline/alcohol fuel blend. The control apparatus sets the engine idling speed at a target value calculated as a function of engine coolant temperature. That is, the engine idling speed is set at a greater value as the engine coolant temperature decreases. In such an engine idling control apparatus, however, the target engine speed calculation is made regardless of the alcohol concentration contained in the fuel supplied to the engine. Because of this, the harmful emission of aldehyde from the engine will increase as the alcohol concentration contained in the fuel increases if the engine idling speed is set at a target value appropriate for gasoline fuel. The aldehyde concentration contained in the exhaust gases discharged from the engine is three or four times greater in the case of alcohol fuel than in the case of gasoline fuel. Although the catalytic converter can purify 90 or more percents of aldehyde emission when fully activated, a great amount of aldehyde will be discharged to the atmosphere until the catalytic converter is activated. In addition, any attempt to reduce the harmful emission of aldehyde by setting the engine idling speed at a target value appropriate for alcohol fuel will result in substantially poor fuel economy.

SUMMARY OF THE INVENTION

It is, therefore, a main object of the invention is to provide an engine idling speed control apparatus which can minimize the harmful emission of aldehyde to the atmosphere without fuel economy loss over the entire range of alcohol concentrations contained in the fuel supplied to the engine.

There is provided, in accordance with the invention, an apparatus for use with an internal combustion engine operable on either of gasoline fuel, alcohol fuel and gasoline/alcohol fuel blend. The apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and an engine coolant temperature sensor sensitive to an engine coolant temperature for producing an engine coolant temperature signal indicative of a sensed engine coolant temperature. A control unit is coupled to the alcohol-concentration, oxygen and engine-coolant-temperature sensors. The control unit includes means responsive to the air/fuel ratio feedback signal for correcting the fuel supplid to the engine to maintain a desired air/fuel ratio when the sensed engine coolant temperature exceeds a predetermined value. The control unit also includes means responsive to an idle engine condition for calculating a target value for engine speed as a function of alcohol concentration and engine coolant temperature when the coolant temperature is below the predetermined value. The control unit is coupled to means for adjusting the engine speed at the calculated target value.

BRIEF DESCRIPTION OF THE DRAWINGS

The invention will be described in greater detail by reference to the following description taken in connection with the accompanying drawings, in which:

FIG. 3A is a diagram showing an M85 table used in calculating target engine idling speed values for alcohol concentrations greater than a predetermined value; and FIG. 3B is a diagram showing an M0 table used in calculating target engine idling speed values for alcohol concentrations less than a predetermined value.

DETAILED DESCRIPTION OF THE INVENTION

Figure 1:
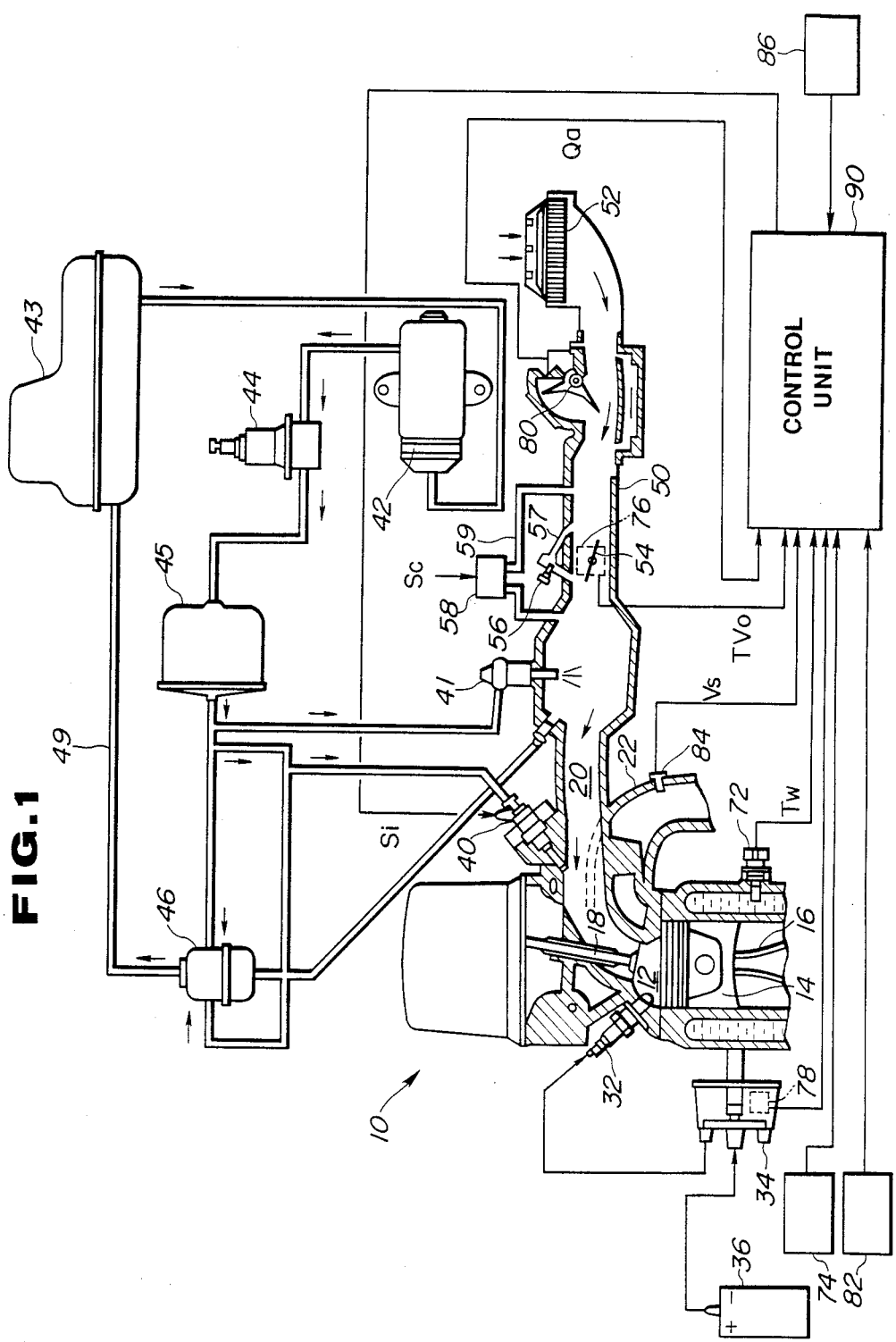
FIG. 1 is a schematic diagram of an internal combustion engine to which the invention is applicable.

With reference to the drawings, and in particular to FIG. 1, there is shown a schematic diagram of an engine control apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10 in response to reciprocation of the piston 14 within the cylinder 12.

An intake manifold 20 is connected with the cylinder 12 through an intake port with which an intake valve 18 is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy from a distributor 34 connected to an ignition coil 36. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The intake and exhaust valves are driven through a suitable linkage with the crankshaft.

A fuel injector 40 is mounted for injecting fuel into the intake manifold 20 toward the intake valve 18. A fuel pump 42 is connected on its one side to a fuel tank 43 and on the other side thereof to the fuel injector 40 and also to a fuel pressure regulator 46 through a fuel damper 44 and a fuel filter 45. The fuel pump 42 is electrically operated to maintain sufficient pressure. The fuel tank 43 contains a gasoline fuel or a gasoline-alcohol fuel blend. The alcohol fuel may include methanol, ethanol, or methanol/ethanol blend. Preferably, a device is provided for stirring the gasoline-alcohol fuel blend to achieve a constant alcohol concentration in the fuel tank 43. The fuel damper 44 attenuates pulsations in the flow of fuel from the fuel pump 42. The fuel filter 45 prevents any contaminants from reaching the fuel injector 40. The pressure regulator 46 maintains the pressure differential across the fuel injector 40 at a constant level. This regulation is accomplished by a variation in the amount of excess fuel returned through a return conduit 49 to the fuel tank 43. The fuel injector 40 opens to inject fuel into the intake manifold 12 when it is energized by the presence of electrical signal Si. The length of the electrical pulse, that is, the pulse-width, applied to the fuel injector 40 determines the length of time the fuel injector opens and, thus, determines the amount of fuel injected into the intake manifold 20. The numeral 41 designates a cold start valve which is operated to inject fuel into the intake manifold 20 so a to provide a fuel enrichment for engine cold starting only when the engine is starting at a cylinder-head coolant temperature less than a predetermined value.

Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal (not shown). The degree to which the accelerator pedal is depressed controls the degree of rotation of the throttle valve 54. The accelerator pedal is manually controlled by the operator of the engine control system. AN idle adjustment screw 56 is provided to control the amount of air introduced into the induction passage 50 through a passage 57 bypassing the throttle valve 54 when the engine is idling. Similarly, a control valve 58 is provided to control the amount of air introduced into the induction passage 50 through a passage 59 bypassing the throttle valve 54. Preferably, the control valve 58 responds to a control pulse signal Sc by opening the bypass passage 59 according to the duty ratio of the control pulse signal Sc.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 32 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. The exhaust gases are discharged to the atmosphere through an exhaust system which conventionally includes an exhaust passage, a catalytic converter, a muffler and an exhaust pipe. The catalytic converter is effective to purify exhaust emissions discharged from the engine.

Although the engine 10 as illustrated in FIG. 1 shows only one combustion chamber 12 formed by a cylinder and piston. It should be understood that the engine control apparatus described herein is designed for use on a multi-cylinder engine. Thus, it should be understood that the number of the intake valves, exhaust valves, reciprocating pistons, spark plugs and fuel injectors are the same as the number of the cylinders. Only one throttle valve 54, one cold start valve 41, and one ignition coil 36 are required for multi-cylinder applications.

The amount of fuel metered to the engine, this being determined by the width of the electrical pulses Si applied to the fuel injector 40, the fuel-injection timing, and the ignition-system spark timing are repetitively determined from calculations performed by a digital computer, these calculations being based upon various conditions of the engine that are sensed during its operation. These sensed conditions include cylinder-head coolant temperature TW, fuel temperature TF, throttle idling position TVo, engine speed N, intake air flow QA, exhaust oxygen content VS, and alcohol concentration AC. Thus, a cylinder-head coolant temperature sensor 72, a fuel temperature 74, a throttle position sensor 76, a crankshaft position sensor 78, a flow meter 80, an alcohol concentration sensor 82, an oxygen sensor 84, and an idle switch 86 are connected to a control unit 90.

The cylinder-head coolant temperature sensor 72 is mounted in the engine cooling system and comprises a thermistor connected to an electrical circuit capable of producing a coolant temperature signal in the form of a DC voltage having a variable level proportional to coolant temperature TW. The fuel temperature sensor 74 is provided for sensing the temperature of the fuel to the fuel injector 40 and connected to a linearizer capable of producing a fuel temperature signal in the form of a DC voltage proportional to a sensed fuel temperature TF. The throttle position sensor 76 is a potentiometer electrically connected to a voltage divider circuit for producing a throttle position signal in the form of a DC voltage proportional to throttle valve position TVo. The crankshaft position sensor 78 is provided for producing a series of crankshaft position electrical pulses, each corresponding to two degrees of rotation of the engine crankshaft, of a repetitive rate directly proportional to engine speed N and a predetermined number of degrees before the top dead center position of each engine piston. The flow meter 80 is responsive to the air flow Qa through the induction passage 50 and it produces an intake airflow signal Qa proportional thereto.

The alcohol concentration sensor 82 is located at a position suitable to sense an alcohol concentration AC contained in the fuel delivered to the fuel injector 40 and it produces an alcohol concentration signal indicative of a sensed alcohol concentration AC. The alcohol concentration sensor 82 may comprises a capacitive probe inserted in the conduit 41 connected to the fuel injector 40. The capacitive prove has a capacitance variable in dependence on the alcohol concentration AC of the fuel delivered to the fuel injector 40. The capacitive probe is connected to a circuit for producing a signal proportional to the probe capacitance.

The oxygen sensor 84 monitors the oxygen content of the exhaust and it is effective to provide an air/fuel ratio feedback signal VS that shifts abruptly between a high voltage representing as rich mixture relative to the stoichiometric value and a low value representing a lean mixture relative to the stoichiometric value. Consequently, the air-fuel ratio feedback signal is useful to indicate only the sense of deviation of the air/fuel ratio relative to the stoichiometric value. The output of the oxygen sensor 84 is provided to a comparator switch whose output is high or low value representing the sense of deviation of the air/fuel ratio of the mixture supplied to the engine from the stoichiometric value. The output of the comparator switch is coupled to a circuit which provides an air/fuel ratio control signal which varies at a constant rate in one direction when the air/fuel ratio is leaner than the stoichiometric value and changes at a constant rate in the opposite direction when the air/fuel ratio is greater than the stoichiometric value. The control signal will oscillate about the stoichiometric air/fuel ratio as sensed by the oxygen sensor thereby producing an average stoichiometric air/fuel ratio of the mixture supplied to the engine.

The idle switch 86 produces an idle condition signal indicative of the fact that the engine is idling when the throttle position is at an angle less than a fixed value, for example, 6° open.

The control unit 90 comprises a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the flow meter and other sensors and converts them into digital form for application to the central processing unit which selects the input channel to be converted. The read only memory contains programs for operating the central processing unit and further contains appropriate data in look-up tables used in calculating appropriate values for fuel delivery requirements, ignition-system spark timing and idling speed. The central processing unit is programmed in a known manner to interpolate between the data at different entry points.

The central processing unit calculates the fuel delivery requirement in the form of fuel-injection pulsewidth from an arithmetric relationship programmed into the computer. This arithmetric relationship defines fuel-injection pulse-width as a function of intake air flow Qa, engine speed N, and cylinder-head coolant temperature Tw. The calculated fuel-injection pulse-width is corrected for the oxygen content of the exhaust to provide a closed loop air/fuel ratio control when the cylinder-head coolant temperature Tw is greater than a predetermined value, for example, 50° C.

The central processing unit calculates the required engine idling speed when the cylinder-head coolant temperature Tw is below the predetermined value above which the closed loop air/fuel ratio control is performed. The status of the idle switch 86 is used to determine whether or not the engine is idling. An engine idle condition is determined when the throttle position is at an angle less than a fixed value, for example, 6° open and the engine is operating at a speed less than a predetermine value, for example, 800 rpm, or when the throttle position is at an angle less than a fixed value, for example, 6° open and the vehicle transmission is in neutral. The central processing unit calculates the required engine idling speed as a function of cylinder-head coolant temperature and alcohol concentration. A higher idling speed is set at a lower cylinder-head coolant temperature and at a greater alcohol concentration. When the fuel contains no or small alcohol concentration, the engine idling speed is adjusted at a relatively small value to achieve fuel economy. However, it takes precedence of fuel enconomy to minimize harmful emission of aldehyde by increasing the engine idling speed so as to activate the catalytic converter at a higher rate or increase the aldehyde purifying efficiency of the catalytic converter.

Control words specifying desired fuel delivery requirements and engine idling speed are periodically transferred by the central processing unit to the control circuits included in the input/output control unit. The fuel injection control circuit converts the received control word into a fuel injection pulse signal for application to a power transistor which connects the fuel injector 40 to the engine battery for a time period determined by the width of the fuel injection control pulse signal. The idling speed control circuit converts the received control words into a valve control pulse signal having a duty ratio at which the control valve 58 operates to control the air flow through the bypass passage 59 in such a manner as to permit a greater amount of air to flow through the bypass passage 59 for a requirement for an increased engine idling speed.

Figure 2:
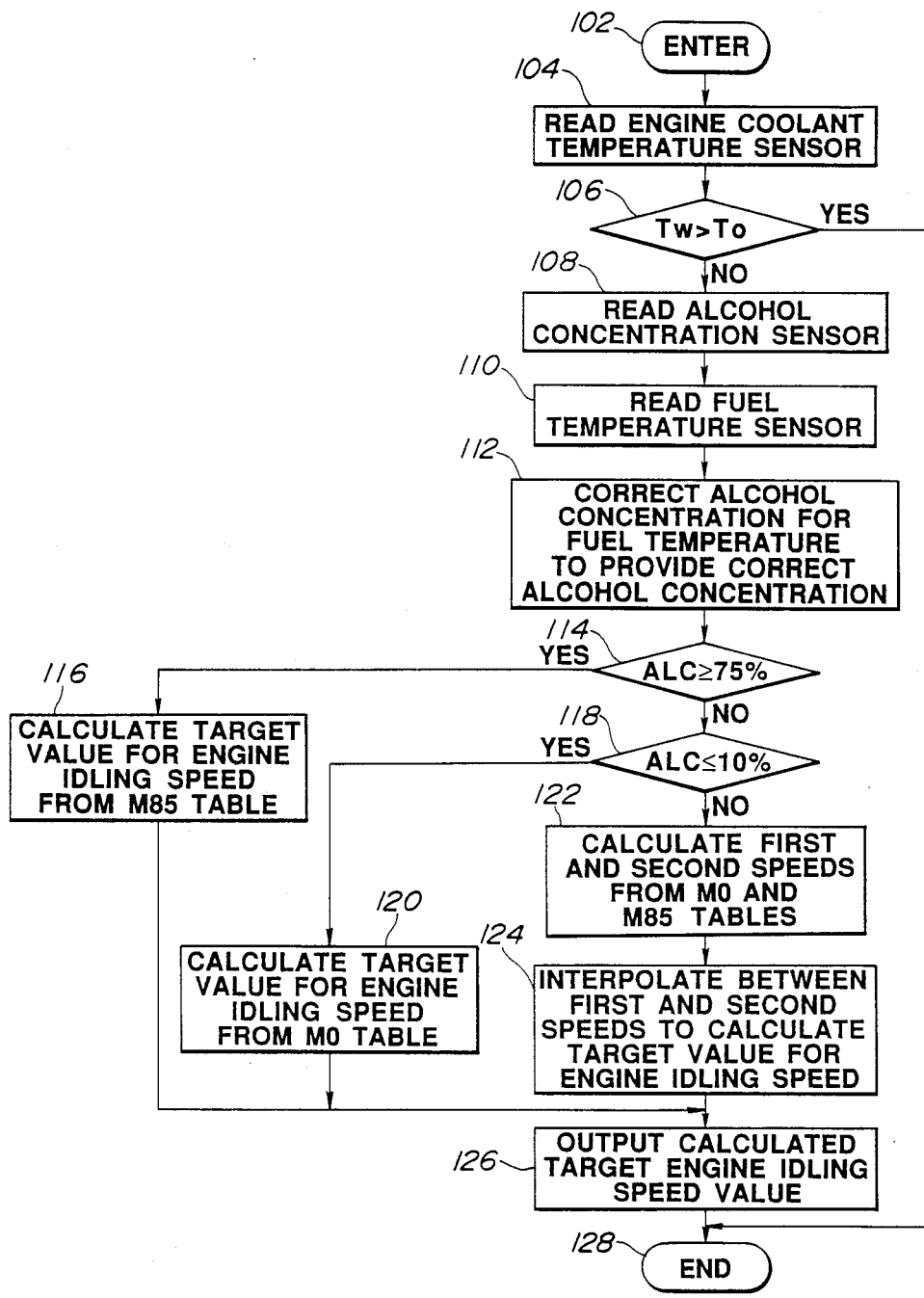
FIG. 2 is a flow diagram illustrating the programming of the digital computer as it is used to control the engine speed at idle conditions.

FIG. 2 is a flow diagram illustrating the programming of the digital computer as it is used to control the speed of rotation of the engine at idle conditions.

The computer program is entered at the point 101 at uniform intervals of time when the engine is idling. At the point 104 in the program, the coolant temperature signal fed from the cylinder-head coolant temperature sensor 72 is converted into digital form and read into the computer memory. At the point 106 in the program, a determination is made as to whether or not the read coolant temperature value Tw is greater than a predetermined value, for example, 50° C. If answer to this question is "yes", then it means that the engine is operating with a closed loop air/fuel ratio control and the program proceeds to the end point 124. Otherwise, the program proceeds to the point 108 where the alcohol concentration signal fed from the alcohol concentration sensor 82 is converted into digital form and read into the computer memory. At the point 110 in the program, the fuel temperature signal fed from the fuel temperature sensor 74 is converted into digital form and read into the computer memory. The read fuel temperature signal value is used at the point 112 to compensate the read alcohol concentration signal value for fuel temperature so as to provide a correct alcohol concentration value ALC.

At the point 114 in the program, a determination is made as to whether the alochol concentration value ALC is equal to or greater than 75%. If the answer to this question is "yes", then the program proceeds to the point 116 where the central processing unit calculates a target speed value from an M85 table, as shown in FIG. 3A. The character "M85" means a fuel contains 85% alcohol concentration. It is intended through the invention that the number affixed to the letter "M" means the alcohol concentration contained in the fuel delivered to the fuel injector 40. The M85 table stores signals with values indicative of target engine speed (rpm) as a function of cylinder-head coolant temperature (° C.) for a gasoline/alcohol fuel blend (M85) containing 85% alcohol concentration. The M85 Table is used in calculating a target engine speed value for gasoline/alcohol fuel blends containing alcohol concentrations equal to or greater than 75% since the exhaust gases will contain substantially the same aldehyde concentration for gasoline/alcohol fuel blends containing alcohol concentrations greater than 75%. The M85 table specifies a smaller engine speed value for a greater cylinder-head coolant temperature. Following this, the program proceeds to the point 126 where the calculated target engine speed value is transferred to the control logic circuit of the input/output control unit. The control logic circuit then sets the duty ratio at which the control valve 58 operates according to the calculated target speed value.

If the alcohol concentration value ALC is less than 75%, then the program proceeds from the point 114 to another determination step at the point 118. This determination is as to whether or not the alcohol concentration value ALC is equal to or less than 10%. If the answer to this question is "yes", then the program proceeds to the point 120 where the central processing unit calculates a target engine speed value St from an M0 table, as shown in FIG. 3B. The M0 table stores signals with values indicative of target engine speed (rpm) as a function of cylinder-head coolant temperature (° C.) for a gasoline fuel containing no alcohol. The M0 table is used in calculating a target engine speed value for gasoline/alcohol fuel blends containing alcohol concentrations equal to or less than 10% since the exhaust gases will contains substantially the same aldehyde concentration for gasoline/alcohol fuel blends containing alcohol concentrations equal to or less than 10%. It will be understood that the M0 table may be used in calculating a target engine speed value St for gasoline/alcohol fuel blends containing alcohol concentrations equal to or less than 50% for the same reason. The M0 table specifies a smaller engine speed value for a greater cylinder-head coolant temperature. In addition, the M0 table specifies an engine speed value smaller than that specified by the M85 table for the same cylinder-head coolant temperature to achieve a substantial fuel enconomy. For gasoline/alcohol fuel blends containing high alcohol concentrations, however, it should take precedence of fuel enconomy to minimize harmful emission of aldehyde by increasing the engine speed so as to activate the catalytic converter at a higher rate or increase the aldehyde purifying efficiency of the catalytic converter although a higher fuel economy is achieved for a gasoline/alcohol fuel blend containing a higher alcohol concentration. Following this, the program proceeds to the point 126 where the calculated target engine speed value St is transferred to the control logic circuit which thereby sets the duty ratio at which the control valve 58 operates to control the engine at a speed calculated by the computer.

If the alcohol concentration value ALC is greater than 10%, then the program proceeds from the point 118 to the point 122 where the M0 table is used to calculated a first target engine speed value S0 for the cylinder-head coolant temperature Tw read at the point 104 and the M85 table is used to calculate a second target engine speed value S85 for the cylinder-head coolant temperature Tw read at the point 104. At the point 124 in the program, the central processing unit calculates a target engine speed value St by using a linear interporation as:

$$St = \{(V-V0)/(V85-V0)\} \times (S85-S0) + S0$$

where V is the alcohol concentration signal value read at the point 110, V0 is the alcohol concentration signal value obtained when the fuel contains 0% alcohol concentration, and V85 is the alochol concentration signal value obtained when the fuel contains 85% alcohol concentration.

At the point 126 in the program, the calculated target engine speed value St is transferred to the control ligic circuit which thereby sets the duty ratio at which the control value 58 operates according to the calculated target speed value. Following this, the program proceeds to the end point 128.

Although the M85 table is used in calculating a target engine speed value when the sensed alcohol concentration exceeds 75%, it will be understood, of course, that the M85 table may be replaced with an M100 table which defines target engine speed as a function of cylinder-head coolant temperature for a fuel containing 100% alcohol.

What is claimed is:

1. An apparatus for use with an internal combustion engine operable on either of gasoline fuel, alcohol fuel and gasoline/alcohol fuel blend, comprising:
    an alcohol concentration sensor sensitive to an alcohol concentration of the fuel to be delivered to the engine for producing an alcohol concentration signal indicative of a sensed alcohol concentration;
    an oxygen sensor sensitive to an oxygen content of exhaust gases discharged from the engine for producing an air/fuel ratio feedback signal;
    an engine coolant temperature sensor sensitive to an engine coolant temperature for producing an engine coolant temperature signal indicative of a sensed engine coolant temperature;
    a control unit coupled to the alcohol-concentration, oxygen and engine-coolant-temperature sensors, the control unit including means responsive to the air/fuel ratio feedback signal for correcting the fuel supplied to the engine to maintain a desired air/fuel ratio when the sensed engine coolant temperature exceeds a predetermined value, the control unit including means responsive to an idle engine condition for calculating a target value for engine speed as a function of alcohol concentration and engine coolant temperature when the coolant temperature is below the predetermined value; and
    means coupled to the control unit for adjusting the engine speed at the calculated target value.

2. The apparatus as claimed in claim 1, wherein the control unit includes means for setting a higher target engine speed value at a lower engine coolant temperature and a higher target engine speed value at a greater alcohol cocentration.

3. The apparatus as claimed in claim 2, wherein the control unit includes a first table defining target engine speed as a function of engine coolant temperature for a first alcohol concentration, a second table defining target engine speed as a function of engine coolant temperature for a second alcohol concentration less than the first alcohol concentration, means for calculating the target engine speed value for the sensed engine coolant temperature from the first table when the sensed alcohol concentration exceeds a first predetermined value and from the second table for the sensed engine coolant temperature when the sensed alcohol concentration is below a second predetermined value less than the first predetermined value, the first predetermined value being equal to or less than the second alcohol concentration, the second predetermined value being equal to or greater than the second alcohol concentration.

4. The apparatus as claimed in claim 3, wherein the control unit includes means for calculating first and second engine speed values for the sensed engine coolant temperature from the first and second tables, respectively, and interporating betweend the calculated first and second engine speed values to obtain the target engine speed value when the sensed alcohol concentration is less than the first predetermined value and greater than the second predetermined value.

5. The apparatus as claimed in claim 2, wherein the engine includes a throttle valve for controlling air flow to the engine, and an exhaust system having a catalytic converter for purifying exhaust emissions discharged from the engine, and wherein the engine speed adjusting means includes a passage bypassing the throttle valve for supplying air to the engine, and a control value provided for controlling air flow through the passage to maintain the engine speed at the calculated target value.

* * * * *